(12) United States Patent
Manley et al.

(10) Patent No.: US 9,264,668 B2
(45) Date of Patent: Feb. 16, 2016

(54) METHODOLOGY FOR NEGOTIATING VIDEO CAMERA AND DISPLAY CAPABILITIES IN A MULTI-CAMERA/MULTI-DISPLAY VIDEO CONFERENCING ENVIRONMENT

(71) Applicant: Communications Hong Kong Ltd., Causeway Bay Hong Kong (HK)

(72) Inventors: Peter H. Manley, Draper, UT (US); Sandeep Kalra, Salt Lake City, UT (US); Derek Graham, South Jordan, UT (US); Avishay Ben Natan, Hod Hasharon (IL)

(73) Assignee: ClearOne Communications Hong Kong Ltd., Causeway Bay Hong (HK)

( * ) Notice: Subject to any disclaimer, the term of this patent is extended or adjusted under 35 U.S.C. 154(b) by 0 days.

(21) Appl. No.: 14/496,191

(22) Filed: Sep. 25, 2014

(65) Prior Publication Data
US 2015/0092008 A1 Apr. 2, 2015

Related U.S. Application Data

(60) Provisional application No. 61/883,639, filed on Sep. 27, 2013.

(51) Int. Cl.
*H04N 7/14* (2006.01)
*H04N 7/15* (2006.01)
*H04L 29/06* (2006.01)

(52) U.S. Cl.
CPC ............... *H04N 7/15* (2013.01); *H04L 65/403* (2013.01)

(58) Field of Classification Search
CPC ........................................................ H04N 7/14
USPC .......... 348/14.01, 14.05, 14.12, 14.08, 14.09, 348/14.07
See application file for complete search history.

(56) References Cited

U.S. PATENT DOCUMENTS

| 2012/0200658 A1* | 8/2012 | Duckworth | H04N 7/152 348/14.07 |
|---|---|---|---|
| 2014/0063176 A1* | 3/2014 | Modai | H04N 5/23219 348/14.05 |
| 2015/0092008 A1* | 4/2015 | Manley | H04N 7/15 348/14.07 |

\* cited by examiner

*Primary Examiner* — Olisa Anwah
(74) *Attorney, Agent, or Firm* — Matthew J. Booth & Associates PLLC; Matthew J. Booth

(57) ABSTRACT

This disclosure describes a system and method for negotiating video camera and display capabilities in a multi-camera/multi-display video conferencing environment. The method includes the at least one processor (120, 210, 218) determining negotiation information associated with a group of local devices (112). The negotiation information includes relative spatial information and data stream characteristics. The method also includes the at least one processor (120, 210, 218) defining the determined negotiation information in a predetermined format compatible with at least one remote device (114). The method further includes the at least one processor (120, 210, 218) applying the determined negotiation information for negotiating capability of at least one device (112-1) among the group of local devices (112) and the at last one remote device (114) for data communication.

20 Claims, 6 Drawing Sheets

METHODOLOGY FOR NEGOTIATING VIDEO CAMERA AND DISPLAY CAPABILITIES IN A MULTI-CAMERA/MULTI-DISPLAY VIDEO CONFERENCING ENVIRONMENT

CROSS REFERENCE TO RELATED APPLICATIONS

This application claims priority and the benefits of the earlier filed Provisional U.S. Application No. 61/883,639, filed 27 Sep. 2013, which is incorporated by reference for all purposes into this specification.

TECHNICAL FIELD

The present disclosure relates to video conferencing systems, and more particularly relates to systems and methods for negotiating video camera and display capabilities in a video conferencing environment.

BACKGROUND ART

Various types of communication systems may be employed for conducting a video conferencing session. Such communication systems may be associated with multiple cameras or screens. Typically, such multi-camera or multi-screen communication systems employ a group of video conferencing end-points (VC end-point), each of which being connected to one or more screens and can send one or more video streams. This combination of video streams generally comprises a live video, which may be captured with a high resolution video, and a presentation or pre-recorded video captured from a program source, such as a PC and DVD or Blu-ray player.

Often, a source VC end-point and associated devices (for example, display devices, cameras, servers, etc.) negotiate their communication capabilities (for example, mutually compatible media types, formats, resolutions, protocols, etc.) with those of the destination VC end-point and associated devices. Such communication session typically involves session announcement, session invitation, and parameter negotiation. The set of properties and parameters that define the communication capabilities of a VC end-point are referred to as the session profile.

Traditionally, communication capabilities are mapped manually between the end-points in a local room and the end-points in a remote room for configuring a connection between their respective multi-camera or multi-display systems. For initiating a connection between the end-points, each of the multi-camera systems (or multi-display systems) is typically connected to a master controller that instructs a source end-point to connect with a pre-configured destination end-point. Hence, the existing approach requires an administrator to pre-configure this mapping manually and requires the administrator to have prior knowledge of how the remote system is configured.

SUMMARY OF INVENTION

This disclosure describes a system and method for negotiating video camera and display capabilities in a multi-camera/multi-display video conferencing environment.

In one exemplary embodiment, a method for negotiating device capability in a network environment including at least one processor is disclosed. The method comprises a step of determining, by the at least one processor, negotiation information associated with a group of local devices, wherein the negotiation information includes relative spatial information and data stream characteristics. The method also comprises a step of defining, by the at least one processor, the determined negotiation information in a predetermined format compatible with at least one remote device. The method further comprises a step of applying, by the at least one processor, the determined negotiation information for negotiating the capability of at least one device among the group of local devices and the at last one remote device for data communication.

In another exemplary embodiment, a system for negotiating device capability in a network environment including at least one processor is disclosed. The system comprises a group of local cameras configured to capture a data stream upon being active, at least one remote display in communication with the group of local cameras, and at least one processor. The at least one processor determines negotiation information associated with the group of local cameras, wherein the negotiation information includes relative spatial information and data stream characteristics. The at least one processor also defines the determined negotiation information in a predetermined format compatible with the at least one remote display. Further, the at least one processor applies the determined negotiation information for negotiating capability of at least one camera among the group of local cameras and the at last one remote display for data communication.

In yet another embodiment, a non-transitory computer readable medium storing a program causing a computer to execute a process for negotiating video camera and display capabilities in a video conferencing environment is disclosed. The process comprises a step of determining, by at least one processor, negotiation information associated with a group of local cameras, wherein the negotiation information includes relative spatial information and data stream characteristics. The process also comprises defining, by the at least one processor, the determined negotiation information in a predetermined format compatible with at least one remote display. Further, the process comprises a step of applying, by the at least one processor, the determined negotiation information for negotiating capability of at least one camera among the group of local cameras and the at last one remote display for data communication.

One aspect of the present disclosure comprises the at least one processor sending the defined negotiation information to the at least one remote device. The at least one processor also mapping data streams from the at least one device among the group of local devices to the at least one remote device using the defined negotiation information. Further, the at least one processor defining a predetermined layout of the mapped data streams on the at least one remote device based on the sent defined negotiation information.

Another aspect of the present disclosure comprises the data stream is a video stream.

Still another aspect of the present disclosure comprises the group of local devices including at least one camera.

Still another aspect of the present disclosure comprises the at least one remote device including at least one display.

Yet another aspect of the present disclosure comprises the relative spatial information including at least one of spatial position and orientation.

Further aspects of the present disclosure comprises the data stream characteristics including at least one of media types, transport protocols, formats, and associated media ports.

Still another aspect of the present disclosure comprises the defined negotiated information including one or more predetermined media attributes defined in a session description protocol format.

Yet another aspect of the present disclosure comprises the one or more predetermined media attributes include at least one port identifier associated with a data stream, and a parameter that defines the relative position of at least one physical device providing the data stream among a group of devices.

Another aspect of the present disclosure comprises the one or more predetermined media attributes including at least one port identifier associated with a data stream, a type identifier for the data stream, and a parameter configured to provide a description of the data stream.

Other and further aspects and features of the disclosure will be evident from reading the following detailed description of the embodiments, which are intended to illustrate, and not limit, the present disclosure.

BRIEF DESCRIPTION OF DRAWINGS

To further aid in understanding the disclosure, the attached drawings help illustrate specific features of the disclosure and the following is a brief description of the attached drawings.

DISCLOSURE OF EMBODIMENTS

This disclosure describes a methodology for negotiating video camera and display capabilities in a multi-camera/multi-display video conferencing environment. This disclosure describes numerous specific details in order to provide a thorough understanding of the present invention. One skilled in the art will appreciate that one may practice the present invention without these specific details. Additionally, this disclosure does not describe some well-known items in detail in order not to obscure the present invention.

Figure 1A:
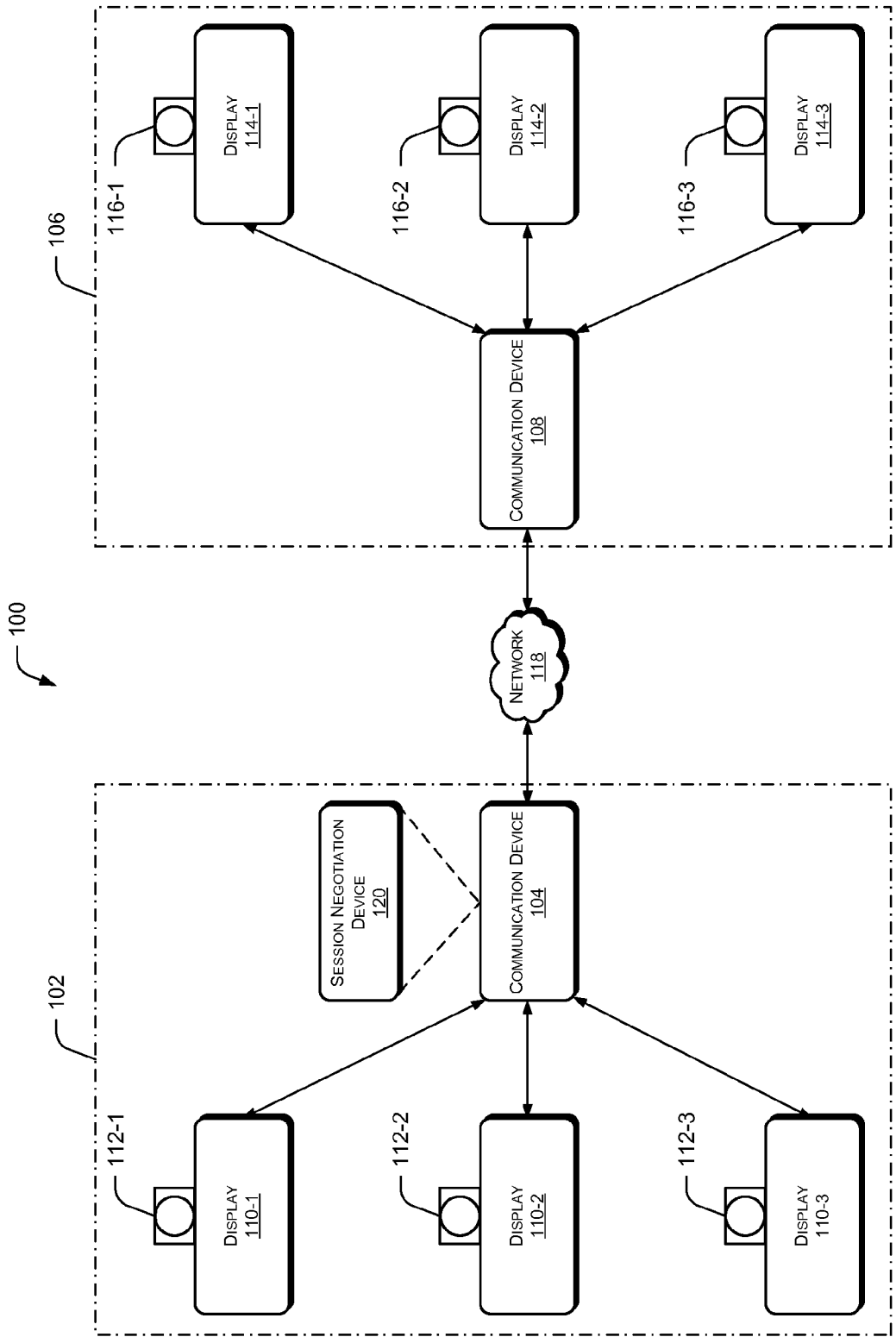
FIG. 1A is a schematic that illustrates a first network environment including an exemplary session negotiation device, according to an embodiment of the present disclosure.

FIG. 1A is a schematic that illustrates a first network environment including an exemplary session negotiation device, according to an embodiment of the present disclosure. Embodiments may include a first network environment 100 (for example, video conferencing, video broadcast, etc.) involving communications between different communication devices (for example, video conferencing systems, etc.) remotely located from each other.

The first network environment 100 may include a first location 102 having a communication device 104 and a second location 106 having a communication device 108. The communication device 104 may be coupled to multiple displays 110-1, 110-2, 110-3 (collectively, displays 110), which may be coupled to cameras 112-1, 112-2, 112-3 (collectively, cameras 112) respectively. Similarly, the communication device 108 may be coupled to multiple displays 114-1, 114-2, 114-3 (collectively, displays 114), which may be coupled to cameras 116-1, 116-2, 116-3 (collectively, cameras 116) respectively.

Each of the communication device 104 and the communication device 108 may be implemented as any of a variety of computing devices (for example, a server, a desktop PC, a notebook, a workstation, a personal digital assistant (PDA), a mainframe computer, a mobile computing device, an internet appliance, etc.) and calling devices (for example, a telephone, an internet phone, etc.).

The communication device 104 may communicate with the communication device 108 over a network 118. The network 118 may include, for example, one or more of the Internet, Wide Area Networks (WANs), Local Area Networks (LANs), analog or digital wired and wireless telephone networks (e.g., a PSTN, Integrated Services Digital Network (ISDN), a cellular network, and Digital Subscriber Line (xDSL)), radio, television, cable, satellite, and/or any other delivery or tunneling mechanism for carrying data. Network 118 may include multiple networks or sub-networks, each of which may include, for example, a wired or wireless data pathway. The network 118 may include a circuit-switched voice network, a packet-switched data network, or any other network able to carry electronic communications. For example, the network 118 may include networks based on the Internet protocol (IP) or asynchronous transfer mode (ATM), and may support voice using, for example, VoIP, Voice-over-ATM, or other comparable protocols used for voice data communications. Other embodiments may involve the network 118 including a cellular telephone network configured to enable exchange of text or multimedia messages.

Figure 1B:
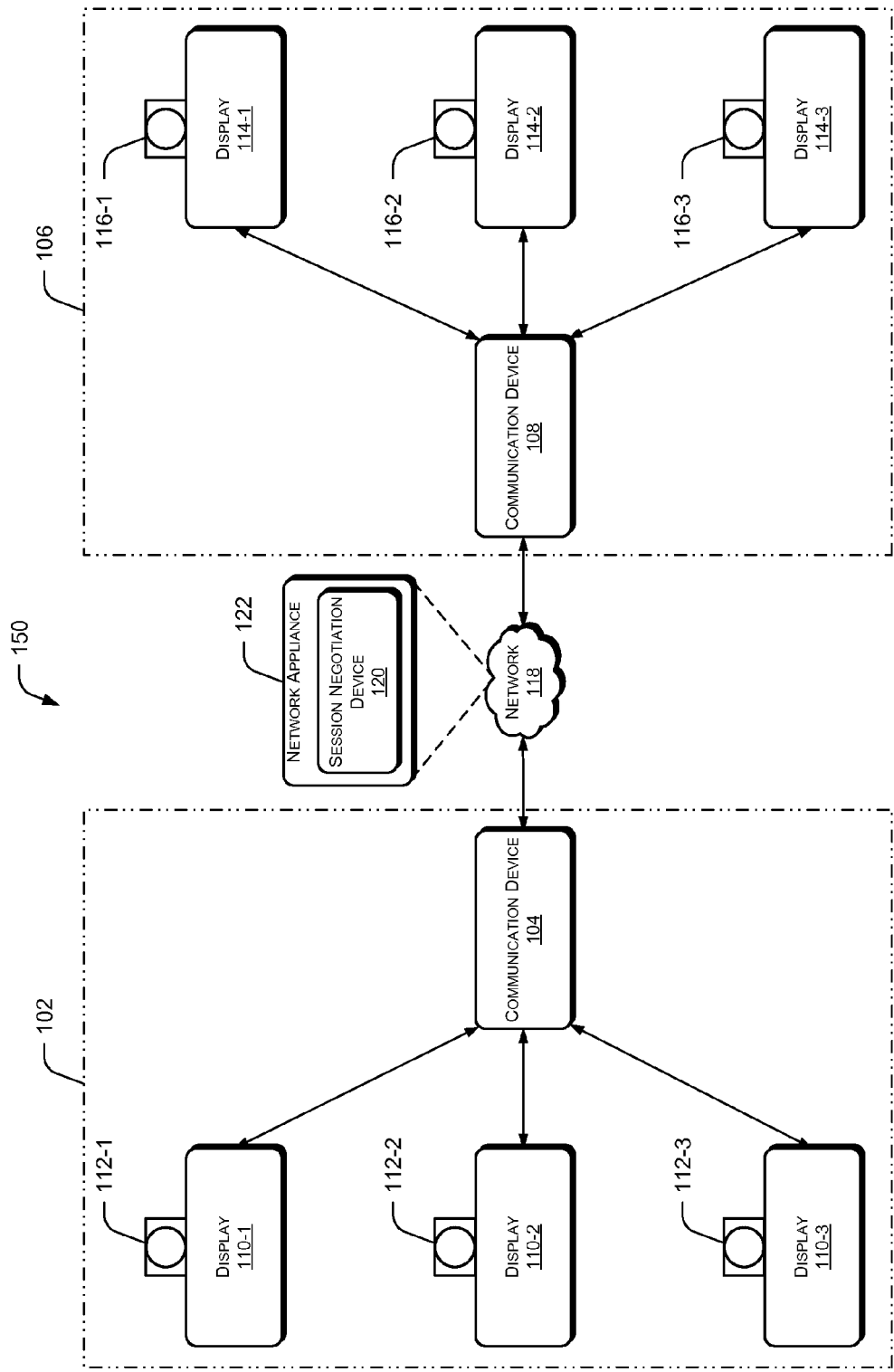
FIG. 1B is a schematic that illustrates a second network environment including the session negotiation device of FIG. 1A, according to an embodiment of the present disclosure.

FIG. 1B illustrates another embodiment 150 where the communication device 104 may include a session negotiation device 120 configured to augment media negotiation protocols by implementing a negotiated device topology and automate mapping of data streams associated with local devices, such as, the cameras 112, to remote devices, such as the displays 114.

The session negotiation device 120 may represent any of a wide variety of devices capable of providing session negotiation and characterization, and media definition services for the network devices. The session negotiation device 120 may be implemented as a standalone and dedicated "black box" including hardware and installed software, where the hardware is closely matched to the requirements and/or functionality of the software. Alternatively, the session negotiation device 120 may be implemented as a software application or a device driver. The session negotiation device 120 may enhance or increase the functionality and/or capacity of the network, such as the network 118, to which it is connected. In some embodiments, the session negotiation device 120 may be configured, for example, to perform e-mail tasks, security tasks, network management tasks including IP address management, and other tasks. In some other embodiments, the session negotiation device 120 may be configured to expose its computing environment or operating code to a user, and may include related art I/O devices, such as a keyboard or display. The session negotiation device 120 of some embodiments may, however, include software, firmware, or other resources that support remote administration and/or maintenance of the session negotiation device 120.

The session negotiation device 120 may be implemented as a single device (for example, a computing device or a portable storage device) or a combination of multiple devices. The session negotiation device 120 may be implemented in hardware or a suitable combination of hardware and software. In some embodiment, the session negotiation device 120 may be a hardware device including at least one processor (not shown) executing machine readable program instructions for establishing a communication channel between the cameras 112 and the remotely located displays 114. The "hardware" may comprise a combination of discrete components, an integrated circuit, an application-specific integrated circuit, a field programmable gate array, a digital signal processor, or other suitable hardware. The "software" may comprise one or more objects, agents, threads, lines of code, subroutines, separate software applications, two or more lines of code or other suitable software structures operating in one or more software applications or on one or more processors. The processor may include, for example, microprocessors, microcomputers, microcontrollers, digital signal processors, central processing units, state machines, logic circuits, and/or any devices that manipulate signals based on operational instructions. Among other capabilities, the processor may be configured to fetch and execute computer readable instructions in a memory associated with the session negotiation device 120.

In some embodiments, the session negotiation device 120 may include, in whole or in part, a software application working alone or in conjunction with one or more hardware resources. Such software applications may be executed by the processor on different hardware platforms or emulated in a virtual environment. Aspects of the session negotiation device 120 may leverage known, related art, or later developed off-the-shelf software.

In other embodiments, the session negotiation device 120 may be integrated or in communication with a mobile switching center, network gateway system, Internet access node, application server, IMS core, service node, or some other communication systems, including any combination thereof. In some embodiments, the session negotiation device 120 may be integrated with or implemented as a wearable device including, but not limited to, a fashion accessory (for example, a wrist band, a ring, etc.), a utility device (a handheld baton, a pen, an umbrella, a watch, etc.), a body clothing, or any combination thereof.

In some embodiments, the session negotiation device 120 may be configured to convert communications, which may include instructions, queries, data, etc., from the communication device 104 into appropriate formats to make these communications compatible with the communication device 108. Consequently, the session negotiation device 120 may allow implementation of the communication device 108 using different technologies or by different organizations, e.g., a third-party vendor, managing the communication device 108 using a proprietary technology.

In another embodiment (FIG. 1B), the session negotiation device 120 may be installed on or integrated with a network appliance 122 configured to establish the network 118 between the communication device 104 and the communication device 108. At least one of the session negotiation device 120 and the network appliance 122 may be capable of operating as or providing an interface to assist exchange of software instructions and data among the communication device 104, the communication device 108, and the session negotiation device 120. In some embodiments, the network appliance 122 may be preconfigured or dynamically configured to include the session negotiation device 120 integrated with other devices. For example, the session negotiation device 120 may be integrated with any networked device such as the communication device 104 connected to the network 118. The communication device 104 may include a module (not shown), which may enable the session negotiation device 120 being introduced to the network appliance 122, thereby enabling the network appliance 122 to invoke the session negotiation device 120 as a service. Examples of the network appliance 122 may include, but are not limited to, a DSL modem, a wireless access point, a router, a base station, and a gateway having a predetermined computing power sufficient for implementing the session negotiation device 120.

The session negotiation device 120 may support a variety of media negotiation protocols known in the art, related art, or developed later including Session Initiation Protocol (SIP), Real-Time Transport Protocol (RTP), Real-Time Streaming Protocol (RTSP), and H.323. The session negotiation device 120 may implement the Session Description Protocol (SDP) as an extension to the media negotiation protocols to negotiate for video streams being compatible with the intended networked devices (for example, the cameras 112 and the displays 114). Such negotiation may involve determination of the communication capability parameters of the networked devices to support exchange of audio, video, and data communications. Examples of communication capability parameters may include, but not limited to, the supported media protocols, supported resolutions, supported bit rates, etc. For example, the session negotiation device 120 may negotiate a single session with the remotely located displays 114 via the communication device 108 by determining video stream capabilities of the displays 114, so that multiple streams of video data may be sent directly between, for example, the cameras 108 and the displays 112.

In one embodiment, the session negotiation device 120 may determine predetermined negotiation information associated with the cameras 112 in addition to the communication capability parameters. The determined negotiation information may be communicated to the displays 114 via the communication device 108 for augmenting the media negotiation protocols. Examples of the negotiation information may include, but are not limited to, relative spatial positions and orientations of the physical cameras 112 associated with data streams identified by respective port descriptors, data stream characteristics (for example, media type, transport protocols, formats, etc.) and operational status of the cameras 112 indicating whether the cameras 112 are active or inactive. The spatial position and orientation of the cameras, such as the cameras 112, may be identified in a Cartesian, cylindrical or spherical coordinate system, or any combination thereof. The session negotiation device 120 may determine the relative spatial positions and orientations of the cameras 112 using a variety of techniques and tools known in the art, related art, or developed later.

In the above embodiment, the determined negotiation information may be communicated as a new media attribute of the video media descriptor in a Session Description Protocol (SDP) format for the session initiation protocol. For example, a new media attribute "streamgroup" may be implemented to describe the order of an outbound set of video streams by virtue of the relative positions and orientations of the physical cameras 112 at the first location 102. The "streamgroup" attribute may be defined as shown in Equation (1):

$$a = \text{streamgroup:} <\text{order}><\text{mediaport\_1}><\text{mediaport\_2}>\ldots<\text{mediaport\_}n> \quad (1)$$

In Equation (1), 'a' may refer to media attributes; <order> may refer to a string that defines the relative position of the physical cameras; and <mediaport_n> may define a port associated with a video stream corresponding to a camera such as the camera 112-1. The port may be defined in the video media descriptor. The Equation (1) may refer to an exemplary syntax for implementing the media attribute in the Session Description Protocol. In some embodiments, the session negotiation device 120 may be additionally configured to provide predefined or dynamically defined media definitions including media type (e.g. 'video', 'audio', etc.), transport details and formats. One such exemplary media definition attribute is shown in Equation (2) for 'video' communications:

$$m=\text{video}<\text{port}>/<\text{number of ports}><\text{proto}><\mathit{fmt}> \quad (2)$$

In Equation 2, <port> may refer to a port defined in the video media descriptor; <number of ports> may refer to a total number of ports being used by a camera such as the camera 112-1 for communicating a video stream; <proto> may refer to a protocol implemented for communicating the video stream; and <fmt> may refer to an extra parameter information. Similar equations may be contemplated for audio and any other type of data streams, or any combination thereof, by a person having skill in the art.

The session negotiation device 120 may implement various predetermined SDP media attributes such as equations (1) and (2) to define a configuration for different resources such as the cameras 112. One exemplary camera configuration is shown in Equation (3).

$$m=\text{video } 49170/3 \text{ RTP/AVP } 99$$

$$a=\text{rtpmap:99 } h264/90000$$

$$a=\text{streamgroup: } L1L2L3 \; 49172 \; 49170 \; 49174 \quad (3)$$

In Equation (3), "m=video 49170/3 RTP/AVP 99" may refer to a session video on port 49170 using RTP Profile for Audio and Video Conferences with minimal Control running over user datagram protocol (UDP). The final 99 may be extra parameter information for RTP/AVP. The another defined attribute "a=streamgroup: L1 L2 L3 49172 49170 49174" may refer to the relative position of the physical cameras 112 as L1, L2, and L3 originating from the media ports 49172, 49170, and 49174 respectively. The described relative positions L1, L2, and L3 may indicate the cameras 112 from a left most position since the cameras 112 may be positioned on top of the displays 110 and facing outwards.

In some embodiments, the session negotiation device 120 may operate in association with various sensors (for example, pressure sensors, proximity sensors, line of sight sensors, etc.) associated with the cameras 112 to determine the negotiation information.

In another embodiment, a session negotiation device may handle mapping of data streams from one location to another location. In one example shown in FIG. 2, a network environment 200 may include multiple integrated communication systems such as integrated communication systems 202-1, 202-2, 202-3 (collectively, integrated communication systems 202) at a first location 204 and integrated communication systems 206-1, 206-2, 206-3 (collectively, integrated communication systems 206) at a second location 208.

Each of the integrated communication systems 202, 206 may include a session negotiation device, a communication device, a camera, and a display. For example, at the first location 204, an integrated communication device 202-1 may include a session negotiation device 210-1 integrated with a communication device 212-1, a display 214-1, and a camera 216-1. Similarly, an integrated communication device 206-1 at the second location 208 may include a session negotiation device 218-1 integrated with a communication device 220-1, a display 222-1, and a camera 224-1. Hereinafter for the descriptions of FIG. 2, FIG. 3, and FIG. 4, various elements such as the cameras 216-1, 216-2, 224-1, 224-2; and the displays 214-1, 214-2, 222-1, 222-2 associated with the respective integrated communication systems 202-1, 202-2 and 206-1, 206-2 will be used to explain the concepts. However, one of skill in the art will understand that similar concepts may also be applicable for other devices shown in FIG. 2.

At the first location 204, the cameras 216-1, 216-2, 216-3 (collectively, cameras 216) may be integrated with one or more sensors (not shown) to detect the presence of an object or person within its field of view. The sensors (for example, proximity sensors) may assist to determine the operation status of one or more cameras 216 as being active or inactive based on the presence of the object or the person such as persons 226-1, 226-2, 226-3 (collectively, persons 226) within the field of view of the corresponding cameras such as the cameras 216-1, 216-2. Each of the session negotiation devices (for example, the session negotiation device 210-1) may be configured to use the operational status (i.e., active or inactive) of the cameras for mapping the data streams from only active cameras at one location to one or more displays at a remote location. For example, when the cameras 216-1, 216-2 may be active based on the presence of the persons 226 being detected, the corresponding session negotiation devices 210-1, 210-2 may map data streams from the camera 216-1 and 216-2 at the first location 204 to the displays 222-2 and 222-1 respectively at the second location 208.

Similarly, session negotiation devices (for example, the session negotiation device 218-1) at the second location 208 may map an active local device (for example, the camera 224-1) to one or more devices (for example, a display 214-2) at a remote location when the presence of one or more objects or persons (for example, persons 228-1, 228-2) is detected by that camera.

In yet another embodiment, a session negotiation device (for example, the session negotiation devices 120, 210) may handle mapping of data streams (for example, video streams) from one location to another location, where each of the locations may have different combinations of resources. As shown in FIG. 3, the session negotiation devices 210-1, 210-2, and 218-1 may be associated with the respective integrated communication systems 202-1, 202-2, 206-1; the respective communication devices 212-1, 212-2, 220-1; the respective displays 214-1, 214-2, 222-1; and the respective cameras 216-1, 216-2, 224-1, as discussed in the description of FIG. 2. At the first location 204, one or more cameras, such as the cameras 216-1 and 216-2, may be active based on detection of persons 226 within the field of view of these cameras. The session negotiation devices 210-1, 210-2 may map the respective active cameras 216-1, 216-2 at the first location 204 to a single display 222-1 at the second location 208.

A communication device such as the communication device 220-1 at the second location 208 may receive multiple video streams from the mapped active cameras 216-1, 216-2. The communication device 220-1 may combine these data streams to display both the data streams simultaneously on the single display 222-1 using various techniques known in the art, related art, or developed later. In one example, the incoming data streams (for example, video streams) may be tiled into a single image 230, or images of the received data streams may be stitched together to form the single image 230 prior to display.

Figure 2:
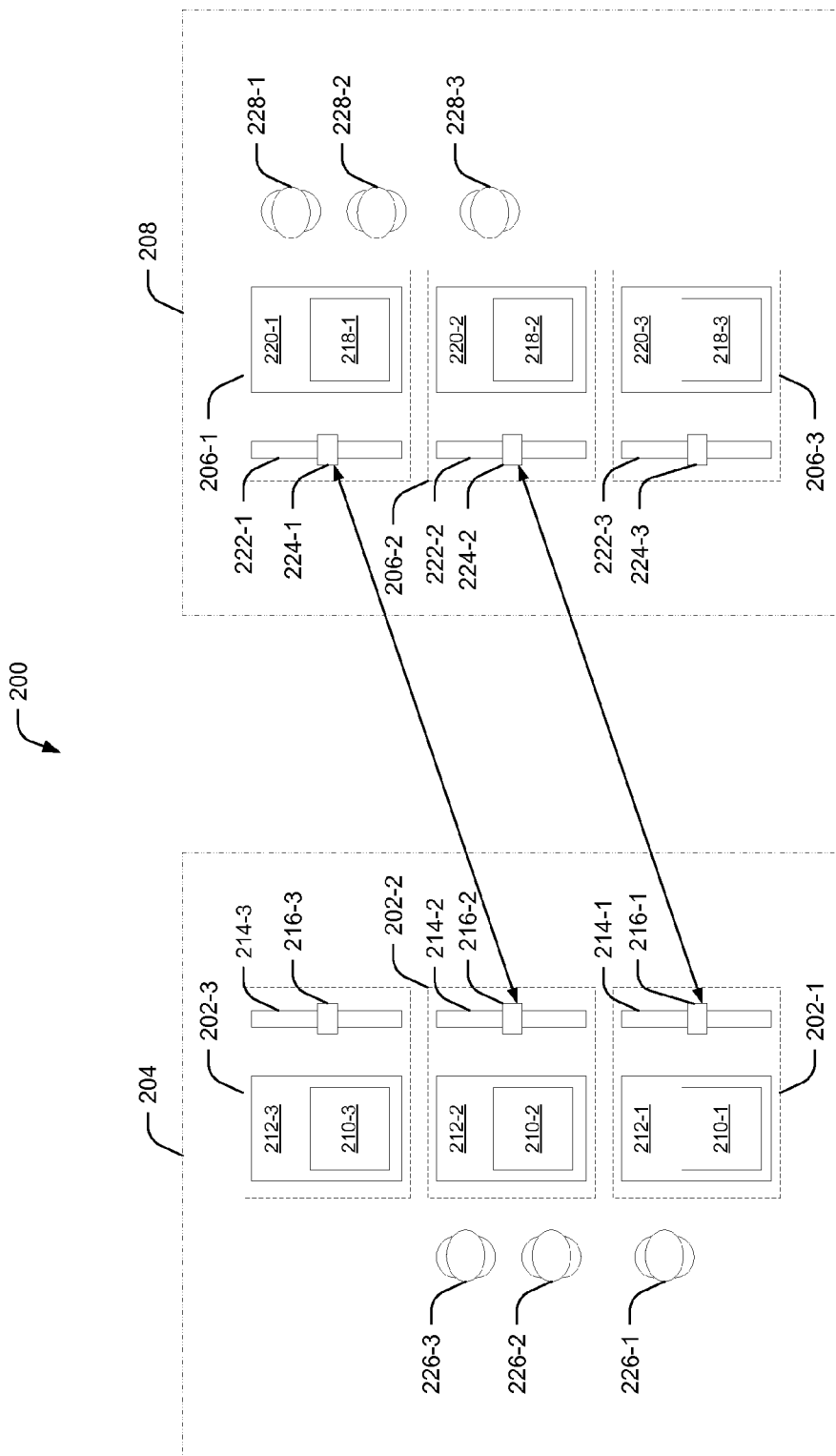
FIG. 2 is a schematic that illustrates a third network environment including the session negotiation device of FIG. 1A, according to an embodiment of the present disclosure.
Figure 3:
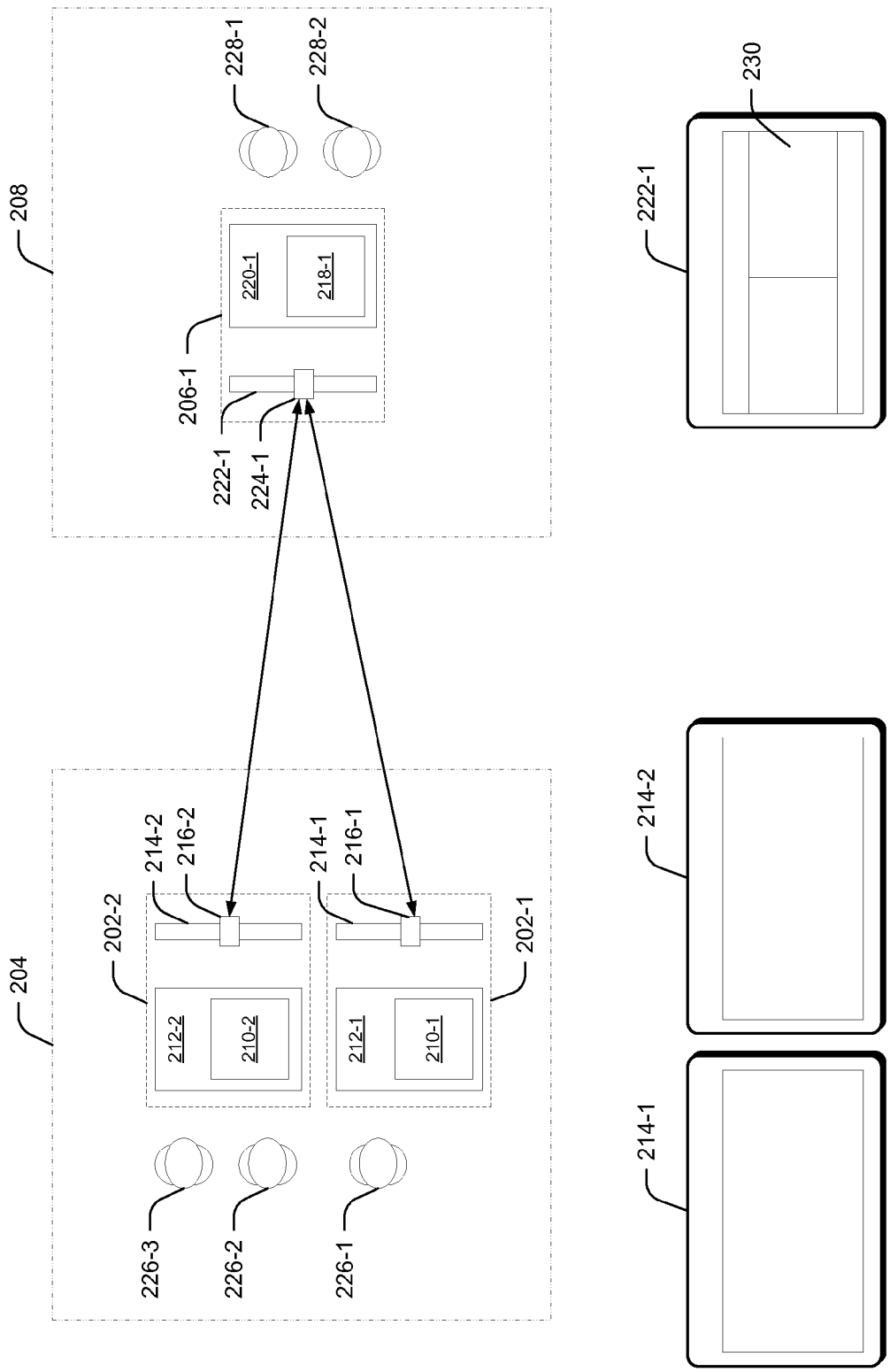
FIG. 3 is a schematic that illustrates a fourth network environment including the session negotiation device of FIG. 1A, according to a first embodiment of the present disclosure.
Figure 4:
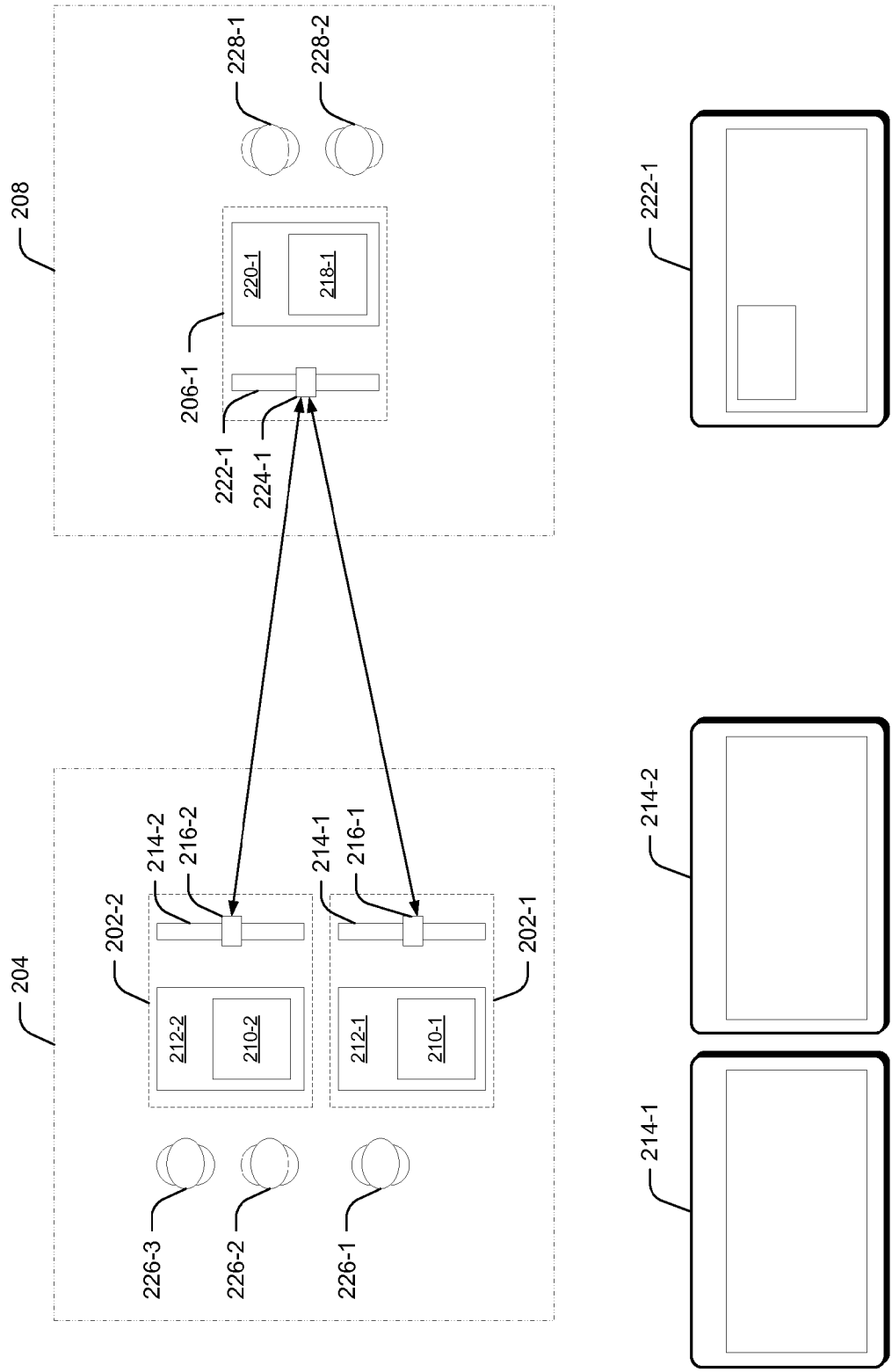
FIG. 4 is a schematic that illustrates a fourth network environment including the session negotiation device of FIG. 1A, according to a second embodiment of the present disclosure.

In another example of FIG. 4, the integrated communication device 202-1, 202-2, and 206-1 and their corresponding underlying elements as discussed in the description of FIG. 2 and FIG. 3 are illustrated. At the first location 204, the integrated communication devices 202-1, 202-2 may include the session negotiation device 210-1, 210-2; the communication devices 212-1, 212-2; the displays 214-1, 214-2; and the cameras 216-1, 216-2 respectively. Similarly the integrated communication device 206-1 at the second location 208 may include the session negotiation device 218-1, the communication device 220-1, the display 222-1, and the camera 224-1.

The communication device 220-1 at the second location 208 may lay one of the received video steams over the other received video stream based on the intended application. For instance, a video stream of a sign language interpreter may be overlaid over another video stream of a news reader from a news house. Such overlaying of video streams may be implemented using various techniques known in the art, related art, or developed later.

In some embodiments, the session negotiation device (for example, the session negotiation devices 120, 210, 218) may assist to dynamically define the layout of video streams on the displays (for example, the display 222-1). The session negotiation device 210 may define a data stream layout based on negotiation and communication capability parameters of the communicating devices (for example, the cameras 216 at the first location 204 and the displays 222 at the second location 208).

In one example, the session negotiation device 210 may be further configured to dynamically define a display layout for the video streams using a predetermined SIP/SDP media attribute associated with each stream. One such exemplary media attribute is shown in Equation (4) below:

$$a=\text{streamdesc:<port><type><description>} \quad (4)$$

In Equation (4), <port> may identify the ports associated with the media stream; <type> may identify whether the stream is required or optional; <description> may provide a textual description of the stream.

The session negotiation device 210 may use Equation (4) for defining a media attribute to display the streams in a preset layout. One example of the defined media configuration using the media attribute of Equation (4) is shown in Equation (5) below:

$$a=\text{streamdesc:49170 optional "ASL interpreter"} \quad (5)$$

$$a=\text{streamdesc:49172 required "conference room camera 1"}$$

$$a=\text{streamdesc:49174 required "conference room camera 2"}$$

In some embodiments, such stream negotiation using Equation (4) may be extended to include data streams, which may be designated as "optional", designated with a predetermined content type, or are based on an intended application. For example, in Equation (5), the media attribute "a=streamdesc:49170 optional "ASL interpreter" may refer to a video stream corresponding to an ASL interpreter from the port 49170 may be optionally negotiated by the session negotiation device. For instance, the session negotiation device 210 may negotiate the video streams of a sign language interpreter to be displayed in an 'overlay mode' (as shown in FIG. 4) only if a deaf person is present in the vicinity of a display such as the display 222-1. The 'overlay mode' may refer to embedding of a data stream within another data stream for display.

Such negotiated device topology implemented by the session negotiation device (for example, the session negotiation device 210) may be extended to various applications. In some embodiments, this topology may be extensible to a multi-party video conferencing environment using either a centralized or a distributed conferencing methodology, where the video streams may be handled in continuous presence or voice switched modes. For example, in a centralized multi-point control unit (MCU) paradigm, the MCU may receive potentially multiple video streams from each endpoint (for example, a camera) at a remote location. The MCU may use the negotiated camera topology implemented by the session negotiation device (for example, the session negotiation device 120, 210, 218) to map incoming video streams to various outbound stream topologies (for example, tiled, overlaid, etc.) on connected or networked devices (for example, displays 110, 114, 214, 222). The negotiated device topology may be implemented in a distributed multi-point conference environment in the similar manner.

In some other embodiments, the negotiated device topology may be implemented by the session negotiated device for "video wall" applications in which a single stream of video may be displayed across multiple displays, which may be logically grouped as a single display.

The negotiated device topology may be completely flexible with respect to (1) compositions and scalability of video stream layers and display windows; and (2) content distribution and a single output of video streams being displayed across multiple devices for final display. Additionally, the negotiated device topology implemented by the session negotiated device may not be limited to or by a grid layout for display and pixel density for each display receiving the augmented, negotiated video streams.

Figure 5:
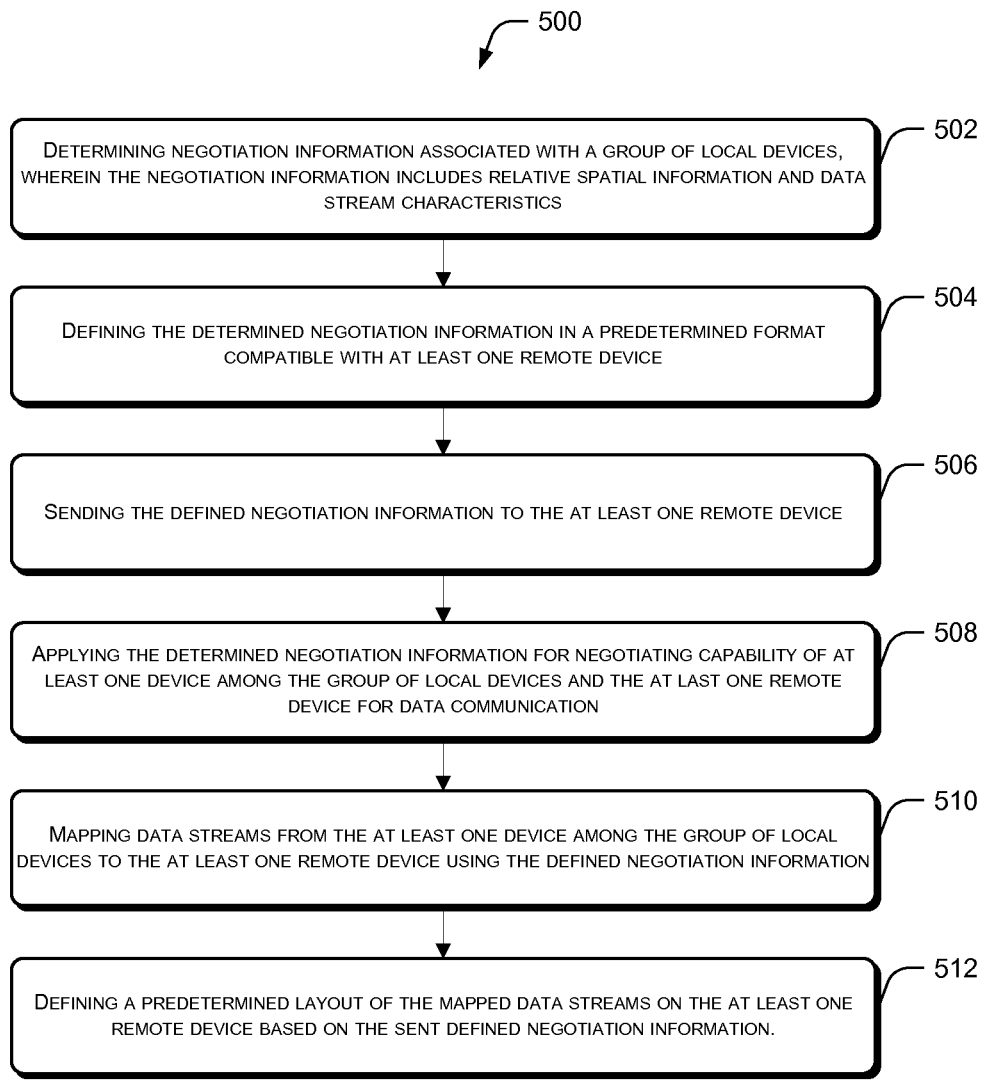
FIG. 5 is a block diagram illustrating an exemplary method for implementing the session negotiation device of FIG. 1A, according to an embodiment of the present disclosure.

FIG. 5 illustrates an exemplary method for implementing the session negotiation device, according to an embodiment of the present disclosure. The exemplary method 500 may be described in the general context of computer executable instructions. Generally, computer executable instructions may include routines, programs, objects, components, data structures, procedures, modules, functions, and the like that perform particular functions or implement particular abstract data types. The computer executable instructions may be stored on a computer readable medium, and installed or embedded in an appropriate device for execution.

The order in which the method 500 is described is not intended to be construed as a limitation, and any number of the described method blocks may be combined or otherwise performed in any order to implement the method 500, or an alternate method. Additionally, individual blocks may be deleted from the method without departing from the spirit and scope of the present disclosure described herein. Furthermore, the method 500 may be implemented in any suitable hardware, software, firmware, or combination thereof, that exists in the related art or that is later developed.

The method 500 describes, without limitation, implementation of the exemplary session negotiation device. One of skill in the art will understand that the method 500 may be modified appropriately for implementation in a various manners without departing from the scope and spirit of the disclosure.

At step 502, negotiation information associated with a group of local devices is determined. In one embodiment, the session negotiation device 120 may determine negotiation information associated with a group of local devices (for example, the cameras 112, the displays 110, etc.). The negotiation information may include, but not limited to, spatial information (for example, position, orientation, etc.) of the group of local devices relative to each other, characteristics of data streams (for example, media types, transport protocols, formats, associated media port, etc.) associated with each of the local devices, etc. The session negotiation device 120 may determine the negotiation information using various sensors known in the art, related art, or developed later including pressure sensors, proximity sensors, and line of sight sensors.

In some embodiments, the negotiation information may include operational status of each of the local devices in the group. The session negotiation device 120 may determine whether any of the local devices is active or inactive by using various sensors such as those mentioned above or field recognition by the camera. For example, a camera (for example, the cameras 112) may be active if a predefined object or person is within the field of view of the camera or any associated sensor.

At step 504, the determined negotiation information is defined in a predetermined format compatible with at least one remote device. In one embodiment, the session negotiation device 120 may support a variety of media negotiation protocols known in the art, related art, or developed later including SIP, RTP, and H.323. The session negotiation device 120 may define various predetermined media attributes in one or more SDP formats as an extension to the media negotiation protocols. The predetermined media attributes such as those discussed above in Equation (1), (2), and (4) may define the determined negotiated information for data streams associated with each of the local devices. Equation (1) may describe the order of an outbound set of data streams based on the relative spatial information of each of the local devices. Equation (2) may describe media definitions including media type (e.g. 'video', 'audio', etc.), transport details and formats for each data stream. Equation (4) may describe display layout for the data streams. The formats of the predetermined media attributes may be compatible with at least one remote device intended for being used for communication.

At step 506, the defined negotiation information is sent to the at least one remote device. Once the media attributes are defined in a compatible protocol such as SDP, the session negotiation device 120 may send the media attributes (such as those discussed with respect to the Equations (1), (2), and (4)) to the at least one remote device in a compatible formats for establishing a data communication channel.

At step 508, the determined negotiation information is applied for negotiating capability of at least one device among the group of local devices and the at least one remote device for data communication. The session negotiation device 120 may apply the determined negotiation information in addition the communication capability parameters to negotiate capability of at least one device among the group of local devices (for example, the cameras 112) and the at least one remote device (for example, the displays 114) for data communication. Minimum acceptable characteristics of the communicating devices (for example, the cameras 112, displays 114, etc.) are determined during negotiation based on which the communication devices may support one or more data streams (for example, video streams, audio streams, etc.).

At step 510, data streams from at least one of the local device in the group of local devices is mapped to at least one remote device based on the defined negotiation information. The session negotiation device 120 may map at least one of the local device in the group of local devices (for example, the cameras 112) to the at least one remote device (for example, the displays 114) based on the determined negotiation information associated with each of the devices in the group of local devices. The session negotiation device 120 may use the defined negotiation information sent to the at least one remote device for such mapping. For example, the session negotiation device 120 may map data streams from a local device (for example, the camera 216-1) to a remote device (for example, the display 222-1) using at least one of the Equations (1), (2), and (4) when the local device is determined to be active.

At step 512, a predetermined layout of the mapped data streams is defined on the at least on remote device based on the sent defined negotiation information. The session negotiation device 120 may predefine or dynamically define a layout for the data streams received on the at least one remote device (for example, the displays 114) using the communicated media attributes of, for example, Equation (4). Based on the defined negotiation information Equation (4), the at least one remote device may display the received data streams such as the incoming video streams as tiled into a single image, or the underlying images being stitched together to form the single image, may be displayed in the 'overlay' mode layout.

The session negotiation device (for example, the session negotiation device 120, 210) may automatically discover the camera/display capabilities and configuration of a remote video conferencing system and automatically map the camera sources to the target displays without any prior knowledge of a remote room using the defined negotiation information. Hence, the session negotiation device (for example, the session negotiation device 120) may reduce operating and administrative costs. Only the phone number/address of the remote endpoint (for example, the communication device 108) may be required to establish a conferencing session. No prior knowledge of the remote conferencing system configuration may be required. Further, since the negotiation information of the local devices provides in-depth and automated negotiation between the communicating devices, the session initiation device provides better performance, increased durability, and improved flexibility. Additionally, implementation of the session negotiation device has a simpler configuration and reduced system hardware cost since, the local end-point only need be configured when the system is installed using a single hardware platform.

To summarize, in one exemplary embodiment, a method for negotiating device capability in a network environment including at least one processor is disclosed. The method comprises a step of determining, by the at least one processor, negotiation information associated with a group of local devices, wherein the negotiation information includes relative spatial information and data stream characteristics. The method also comprises a step of defining, by the at least one processor, the determined negotiation information in a predetermined format compatible with at least one remote device. The method further comprises a step of applying, by the at least one processor, the determined negotiation information for negotiating capability of at least one device among the group of local devices and the at last one remote device for data communication.

In another exemplary embodiment, a system for negotiating device capability in a network environment including at least one processor is disclosed. The system comprises a group of local cameras configured to capture a data stream upon being active, at least one remote display in communication with the group of local cameras, and at least one processor. The at least one processor determines negotiation information associated with the group of local cameras, wherein the negotiation information includes relative spatial information and data stream characteristics. The at least one processor also defines the determined negotiation information in a predetermined format compatible with the at least one remote display. Further, the at least one processor applies the determined negotiation information for negotiating capability of at least one camera among the group of local cameras and the at last one remote display for data communication.

In yet another embodiment, a non-transitory computer readable medium storing a program causing a computer to execute a process for negotiating video camera and display capabilities in a video conferencing environment is disclosed. The process comprises a step of determining, by at least one processor, negotiation information associated with a group of local cameras, wherein the negotiation information includes relative spatial information and data stream characteristics. The process also comprises defining, by the at least one processor, the determined negotiation information in a predetermined format compatible with at least one remote display. Further, the process comprises a step of applying, by the at least one processor, the determined negotiation information for negotiating capability of at least one camera among the group of local cameras and the at last one remote display for data communication.

Other embodiments of the present invention will be apparent to those skilled in the art after considering this disclosure or practicing the disclosed invention. The specification and examples above are exemplary only, with the true scope of the present invention being determined by the following claims.

We claim the following invention:

1. A system for negotiating video camera and display capabilities in a multi-camera/multi-display video conferencing environment, comprising:
    a group of local cameras capturing a data stream upon being active;
    at least one remote display in communication with said group of local cameras; and
    at least one processor in communication with said group of local cameras and said at least one remote display;
    wherein said at least one processor further comprises:
        determining determined negotiation information associated with said group of local cameras, wherein the negotiation information comprises relative spatial information and data stream characteristics;
        defining said determined negotiation information in a predetermined format compatible with said at least one remote display;
        applying said determined negotiation information for negotiating capability of said at least one camera among said group of local cameras and said at last one remote display for data communication;
        sending said determined negotiation information to said at least one remote display;
        mapping data streams from said at least one camera among said group of local cameras to said at least one remote display using said determined negotiation information; and
        defining a predetermined layout of said mapped data streams on said at least one remote display based on said determined negotiation information.

2. The claim according to claim 1, wherein said determined negotiation information is defined as one or more predetermined media attributes in a session description protocol format wherein said predetermined media attributes further comprises at least one of:
    at least one port identifier associated with a data stream and a parameter that defines relative position of at least one camera providing the data stream among a group of local cameras; and
    at least one port identifier associated with a data stream, a type identifier for the data stream, and a parameter providing description of the data stream.

3. The claim according to claim 1, wherein the data stream is a video stream.

4. The claim according to claim 1, wherein the relative spatial information comprises at least one of spatial position and orientation.

5. The claim according to claim 1, wherein the data stream characteristics comprise at least one of media types, transport protocols, formats, and associated media ports.

6. A method to manufacture a system for negotiating video camera and display capabilities in a multi-camera/multi-display video conferencing environment, comprising:
    providing a group of local cameras capturing a data stream upon being active;
    providing at least one remote display in communication with said group of local cameras; and
    providing at least one processor in communication with said group of local cameras and said at least one remote display;
    wherein said at least one processor further comprises:
        determining determined negotiation information associated with said group of local cameras, wherein the negotiation information comprises relative spatial information and data stream characteristics;
        defining said determined negotiation information in a predetermined format compatible with said at least one remote display;
        applying said determined negotiation information for negotiating capability of said at least one camera among said group of local cameras and said at last one remote display for data communication;
        sending said determined negotiation information to said at least one remote display;
        mapping data streams from said at least one camera among said group of local cameras to said at least one remote display using said determined negotiation information; and
        defining a predetermined layout of said mapped data streams on said at least one remote display based on said determined negotiation information.

7. The claim according to claim 6, wherein said determined negotiation information is defined as one or more predetermined media attributes in a session description protocol format wherein said predetermined media attributes further comprises at least one of:
    at least one port identifier associated with a data stream and a parameter that defines relative position of at least one camera providing the data stream among a group of local cameras; and
    at least one port identifier associated with a data stream, a type identifier for the data stream, and a parameter providing description of the data stream.

8. The claim according to claim 6, wherein the data stream is a video stream.

9. The claim according to claim 6, wherein the relative spatial information comprises at least one of spatial position and orientation.

10. The claim according to claim 6, wherein the data stream characteristics comprise at least one of media types, transport protocols, formats, and associated media ports.

11. A method to use a system for negotiating video camera and display capabilities in a multi-camera/multi-display video conferencing environment, comprising:
    capturing a data stream with a group of local cameras upon said data stream being active;
    displaying said data stream from said group of local cameras with at least one remote display; and
    processing said data stream from said group of local cameras and said at least one remote display with at least one processor;
    wherein said at least one processor further comprises:
        determining determined negotiation information associated with said group of local cameras, wherein the negotiation information comprises relative spatial information and data stream characteristics;

defining said determined negotiation information in a predetermined format compatible with said at least one remote display;

applying said determined negotiation information for negotiating capability of said at least one camera among said group of local cameras and said at last one remote display for data communication;

sending said determined negotiation information to said at least one remote display;

mapping data streams from said at least one camera among said group of local cameras to said at least one remote display using said determined negotiation information; and defining a predetermined layout of said mapped data streams on said at least one remote display based on said determined negotiation information.

12. The claim according to claim 11, wherein said determined negotiation information is defined as one or more predetermined media attributes in a session description protocol format wherein said predetermined media attributes further comprises at least one of:

at least one port identifier associated with a data stream and a parameter that defines relative position of at least one camera providing the data stream among a group of local cameras; and at least one port identifier associated with a data stream, a type identifier for the data stream, and a parameter providing description of the data stream.

13. The claim according to claim 11, wherein the data stream is a video stream.

14. The claim according to claim 11, wherein the relative spatial information comprises at least one of spatial position and orientation.

15. The claim according to claim 11, wherein the data stream characteristics comprise at least one of media types, transport protocols, formats, and associated media ports.

16. A non-transitory program storage device readable by a computing device that tangibly embodies a program of instructions executable by the computing device to perform a method to use a system for negotiating video camera and display capabilities in a multi-camera/multi-display video conferencing environment, comprising:

capturing a data stream with a group of local cameras upon said data stream being active;

displaying said data stream from said group of local cameras with at least one remote display; and processing said data stream from said group of local cameras and said at least one remote display with at least one processor;

wherein said at least one processor further comprises:

determining determined negotiation information associated with said group of local cameras, wherein the negotiation information comprises relative spatial information and data stream characteristics;

defining said determined negotiation information in a predetermined format compatible with said at least one remote display;

applying said determined negotiation information for negotiating capability of said at least one camera among said group of local cameras and said at last one remote display for data communication;

sending said determined negotiation information to said at least one remote display;

mapping data streams from said at least one camera among said group of local cameras to said at least one remote display using said determined negotiation information; and defining a predetermined layout of said mapped data streams on said at least one remote display based on said determined negotiation information.

17. The claim according to claim 16, wherein said determined negotiation information is defined as one or more predetermined media attributes in a session description protocol format wherein said predetermined media attributes further comprises at least one of:

at least one port identifier associated with a data stream and a parameter that defines relative position of at least one camera providing the data stream among a group of local cameras; and at least one port identifier associated with a data stream, a type identifier for the data stream, and a parameter providing description of the data stream.

18. The claim according to claim 16, wherein the data stream is a video stream.

19. The claim according to claim 16, wherein the relative spatial information comprises at least one of spatial position and orientation.

20. The claim according to claim 16, wherein the data stream characteristics comprise at least one of media types, transport protocols, formats, and associated media ports.

* * * * *

UNITED STATES PATENT AND TRADEMARK OFFICE
CERTIFICATE OF CORRECTION

PATENT NO. : 9,264,668 B2  
APPLICATION NO. : 14/496191  
DATED : February 16, 2016  
INVENTOR(S) : Peter H. Manley et al.

Page 1 of 1

It is certified that error appears in the above-identified patent and that said Letters Patent is hereby corrected as shown below:

In the specification

In column 7, line 28, delete "L1L2L3" and insert -- L1 L2 L3 --, therefor.

Signed and Sealed this
Seventeenth Day of May, 2016

Michelle K. Lee
*Director of the United States Patent and Trademark Office*